(No Model.)
A. E. BUTLER.
WHEEL FOR VEHICLES.
No. 308,747. Patented Dec. 2, 1884.
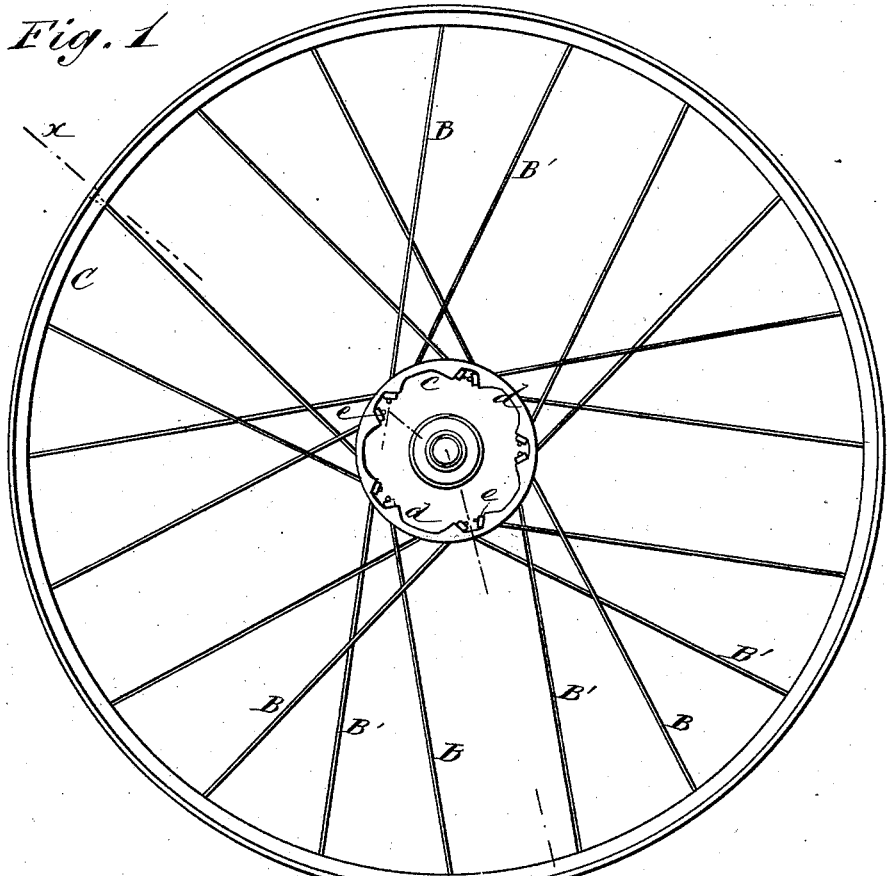
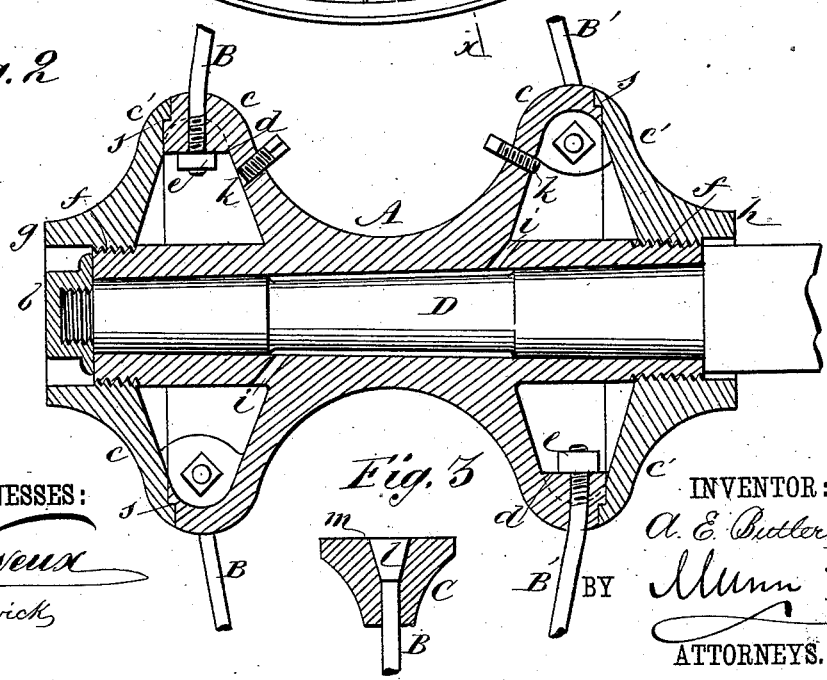
WITNESSES:
C. Neveux
C. Sedgwick
INVENTOR:
A. E. Butler
BY Munn & Co
ATTORNEYS.

UNITED STATES PATENT OFFICE.

ALONZO ELI BUTLER, OF READING, MICHIGAN.

WHEEL FOR VEHICLES.

SPECIFICATION forming part of Letters Patent No. 308,747, dated December 2, 1884.

Application filed April 24, 1884. (No model.)

*To all whom it may concern:*

Be it known that I, ALONZO E. BUTLER, of Reading, in the county of Hillsdale and State of Michigan, have invented certain new and useful Improvements in Wheels for Vehicles, of which the following is a full, clear, and exact description.

My improved wheel is applicable to various kinds of vehicles, both light and heavy, including bicycles, carriages, wagons, &c.; and the invention consists in certain novel constructions and combinations of the hub, rim, and spokes of the wheel, and manner of attaching and adjusting the spokes, whereby I am enabled not only to produce a light, cheap, and durable wheel, but every facility is afforded for adjusting and tightening the spokes and for taking them out and replacing them by others when necessary; likewise all setting of tires to meet variations in the weather is avoided, substantially as hereinafter described.

Reference is to be had to the accompanying drawings, forming part of this specification, in which similar letters of reference indicate corresponding parts in all the figures.

Figure 1 represents a side view of a wheel embodying my invention with one of the hub-caps removed. Fig. 2 is a longitudinal section, upon a larger scale, through the hub of the wheel, on the line $x$ $x$, Fig. 1, also showing the spindle or axle on which the wheel turns and certain of the spokes in part. Fig. 3 is a transverse section, also upon a larger scale, of the rim of the wheel with a portion of one of the spokes fitted thereto.

A indicates the hub, B B' the spokes, and C the rim, of the wheel. D is the spindle or axle on which the wheel turns, and $b$ the usual nut on the end of the axle, for keeping the wheel to its place on the axle. The hub A is constructed near each of its opposite ends with a hollow box-like flange or swell, $c$, of a many-sided peripheral configuration on its interior, as shown at $d$, to form bearings for the nuts $e$, that secure the inner ends of the spokes, which pass through said flanges, to the hub. These box-like flanges $c$ are closed on their outer faces or ends by caps $c'$, constructed to form a lap-joint internally, as at $s$, with the flanges, and arranged to screw onto the ends of the body of the hub, as at $f$; also, to form the point-band $g$ at the outer end of the hub and sand-band $h$ at the inner end thereof. The box-like flanges $c$ and their caps $c'$ also serve to form receptacles for oil, or rather for any suitable packing material saturated with oil, which may be readily inserted therein on taking off the caps $c'$. The oil thus introduced will be automatically supplied in a gradual but sufficient manner by ducts $i$ to the bearing-surfaces of the wheel and axle as the wheel rotates thereon. Oil to replenish the packing when dry may be introduced through oil-holes $k$, closed by screws or other plugs, or fresh-saturated packing may be readily inserted when necessary.

The rim C of the wheel, which is of metal, is constructed so as to dispense with a tire, and receives the spokes B B' obliquely through it from its outside, said spokes being made with flaring outer ends $l$, which fit countersunk holes $m$ in the rim. Each successive spoke is made to cross its adjacent spoke, and the two crossing spokes in each pair of spokes are made to connect with the hollow flanges $c$ at opposite ends of the hub, respectively, thus giving great strength to the wheel. The tension of the spokes may be regulated by the nuts $e$ on the inner ends of them, and every facility is afforded for taking out the spokes and replacing them by others when necessary, or for repair of the spokes, by taking off the caps $c'$. This may be done rapidly and at a trifling expense by even an unskilled hand.

Variations in the weather will have but little effect on the wheel, there being no tire to set or to be affected by a dry or wet condition of the atmosphere.

Having thus described my invention, what I claim as new, and desire to secure by Letters Patent, is—

1. In a wheel, the spokes B B', in combination with the hub A, having at its ends approximately box-shaped flanges $c$ $c$, each having a many-sided peripheral configuration on its interior, as at $d$, to form nut-bearing shoulders for the spokes, substantially as set forth.

2. In a wheel, the spokes B B', in combination with the rim C and the hub A, having at its ends approximately box-shaped flanges $c$, each having a many-sided peripheral configuration on its interior, as at $d$, to form nut-bearing shoulders for the spokes, said box-shaped flanges $c$ being fitted with removable caps $c'$, and having oil-lubricant ducts $i$, substantially as and for the purpose set forth.

3. The combination, with the hub A of the wheel, having hollow flanges $c$ and caps $c'$ at or near opposite ends of the hub, of the rim C of the wheel, and the spokes B, arranged to cross each other in pairs and to connect successively with the opposite end flanges of the hub, substantially as shown and described.

ALONZO ELI BUTLER.

Witnesses:
 DARWIN D. ELDRIDGE,
 MARTIN L. BENTLEY.